(12) United States Patent
Forlines et al.

(10) Patent No.: US 7,773,099 B2
(45) Date of Patent: Aug. 10, 2010

(54) CONTEXT AWARE IMAGE CONVERSION METHOD AND PLAYBACK SYSTEM

(75) Inventors: Clifton L. Forlines, Newton, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 609 days.

(21) Appl. No.: 11/769,990

(22) Filed: Jun. 28, 2007

(65) Prior Publication Data

US 2009/0002397 A1 Jan. 1, 2009

(51) Int. Cl.
*G09G 5/00* (2006.01)
(52) U.S. Cl. .................................. 345/629; 382/169
(58) Field of Classification Search ........................ None
See application file for complete search history.

(56) References Cited

U.S. PATENT DOCUMENTS

| | | | | | |
|---|---|---|---|---|---|
| 5,268,751 | A | * | 12/1993 | Geiger et al. | 348/446 |
| 5,956,092 | A | * | 9/1999 | Ebihara et al. | 348/445 |
| 6,487,323 | B1 | * | 11/2002 | Bonnet et al. | 382/276 |
| 7,383,509 | B2 | * | 6/2008 | Foote et al. | 715/731 |
| 2002/0003545 | A1 | * | 1/2002 | Nakamura | 345/640 |
| 2004/0041917 | A1 | * | 3/2004 | Norcross et al. | 348/220.1 |
| 2004/0114049 | A1 | * | 6/2004 | Arora | 348/445 |
| 2004/0217951 | A1 | * | 11/2004 | An | 345/204 |
| 2005/0104894 | A1 | * | 5/2005 | Sanborn et al. | 345/592 |
| 2005/0209923 | A1 | * | 9/2005 | Jablonski et al. | 705/14 |
| 2005/0225566 | A1 | * | 10/2005 | Kojo | 345/629 |
| 2005/0286794 | A1 | * | 12/2005 | Brunner et al. | 382/264 |
| 2006/0059514 | A1 | * | 3/2006 | Hsiao et al. | 725/42 |
| 2006/0110139 | A1 | * | 5/2006 | Kojima et al. | 386/131 |
| 2006/0246409 | A1 | * | 11/2006 | Akopian | 434/317 |
| 2007/0091111 | A1 | | 4/2007 | Gutta | 345/591 |
| 2008/0285940 | A1 | * | 11/2008 | Kulas | 386/52 |
| 2009/0167843 | A1 | * | 7/2009 | Izzat et al. | 348/43 |

OTHER PUBLICATIONS

U.S. Appl. No. 11/682,521, filed Apr. 11, 2007, Method for Retargeting Images, Avidan.

* cited by examiner

*Primary Examiner*—Kee M Tung
*Assistant Examiner*—David H Chu
(74) *Attorney, Agent, or Firm*—Dirk Brinkman; Gene Vinokur

(57) ABSTRACT

The embodiments of invention provide method and apparatus for converting one or more images for display on a display surface. The output image is obtained from an input image. We scale the input image to generate a foreground image, in which a content of the foreground image corresponds directly to a content of the input image, and in which a resolution of the foreground image when displayed is smaller than a resolution of a display surface. The input image is also transformed to a background image, in which a content of the background image depends indirectly on the input image, and in which a resolution of the background image is larger than the resolution of the foreground image. Next, the foreground image is combined with the background image to form the output image, in which pixels of the foreground image replace corresponding pixels of the background image.

17 Claims, 8 Drawing Sheets

CONTEXT AWARE IMAGE CONVERSION METHOD AND PLAYBACK SYSTEM

FIELD OF THE INVENTION

The invention relates generally to processing images, and more particularly to rendering input images as output images on display surfaces having different resolutions and/or aspect ratios than the input images.

BACKGROUND OF THE INVENTION

While display surfaces of display devices, e.g., televisions, projectors, and desktop and laptop computers, are becoming physically larger and with an increased resolution, the manner in which images are displayed has remained much the same. In general, images produced for smaller display surfaces are simply scaled up to fill the entire larger display surface. Little is done to take full, advantage of what a large display surface has to offer. In addition, the aspect ratio of the display surface can often be different than the aspect ratio of the input image. In this, some means must be provided to reconcile the differences in aspect ratios.

For example, a high-definition television (HDTV), capable of displaying images with 1920×1080 pixels, takes a standard definition television signal with a resolution of 640×480 pixels, and simply scales the low-resolution images of the video to fill the entire high-resolution display surface, and perhaps cropping the sides.

Other examples of displaying low-resolution, images include preserving an original low resolution and/or aspect ratio of the images while rendering the images on a high-resolution display. In such examples, the image occupies just a portion of the display surface, which degrades a viewing experience. A typical example of such displaying method renders black bars on all sides of the images. This is called windowboxing.

Another example is rendering the video retrieved over the Internet in the video original format. In this example the video occupies relatively small portion, of the high-resolution video display.

Another example is letterboxing, where the aspect ratio of the input images is preserved, e.g., a HD signal is preserved in the output images for 4×3 SD display surface. Because the aspect ratio of the display surface is different, the resulting video must include masked-off areas or mattes above and below the output images.

Another example uses a pillarbox effect, which occurs in widescreen displays when black bars, mattes or masking, are placed on the left and right sides of the image.

Thus, typically the conversion uses windowboxing, pillarboxing, or letterboxing, with the mattes being black or unused.

Rendering images on just a portion of a display surface can lead to viewing fatigue, decrease realism and depth of an experience, and undermine the purpose and cost of high-resolution display surfaces.

One method to increase the viewing experience provides ambient light: in the room using "light speakers." which depend on the video content, see U.S. Patent Application 20070091111 "Ambient Light Derived by Subsampling Video Content and Mapped Through Unrendered Color Space," filed by Gutta and published on Apr. 26, 2007. That method requires additional, external to the viewing device, equipment, and may not be suitable for some type of displays and viewing conditions.

A video is composed of a sequence of video frames or images, which are often encoded and compressed to decrease bandwidth and memory requirements. Each frame is displayed independently of a previous or a next frame. It is desired to have a new way for rendering the images on a display surface, which has a different resolution or aspect ratio to increase viewing experience and without a need for any extra special equipment.

SUMMARY OF THE INVENTION

The embodiments of invention provide method and apparatus for converting an image for displaying on a display surface. The resulted output image is obtained from the input image. The input image is scaled to generate a foreground image, in which a content of the foreground image corresponds directly to a content of the input image, and in which a resolution of the foreground image when displayed is smaller than a resolution of a display surface. Also, the input image is transformed to a background image, in which a content of the background image depends indirectly on the input image, and in which a resolution of the background image is larger than the resolution of the foreground image. Next, the foreground image is combined with the background image to form the output image, in which pixels of the foreground image replace corresponding pixels of the background image. In some embodiments of the invention, the method for transforming the background image is varied.

In one embodiment of the invention, the background image is transformed by zooming of the input image.

In another embodiment of the invention, the input image is downsampled to produce a downsampled image. The downsampled image is then upsampled to produce the background image.

In another embodiment of the invention, the upsampled image is darkened to produce the background image.

In case of processing images sequentially, e.g., as for a video, the method combines the foreground and background images on a one-to-one basis. This can cause the background image to have short-term frame-to-frame "flicker." This can distract the viewer. Therefore, a current background image is blended with a set (one or more) of previous background images. The blending can be a function of a difference between the colors of the current image and the colors of the one or more previous background images. This temporal blending has the effect of "smoothing" the appearance of the background image over time. The number of previous background images controls the 'span' of the smoothing.

DETAILED DESCRIPTION OF THE PREFERRED EMBODIMENT

Figure 1:
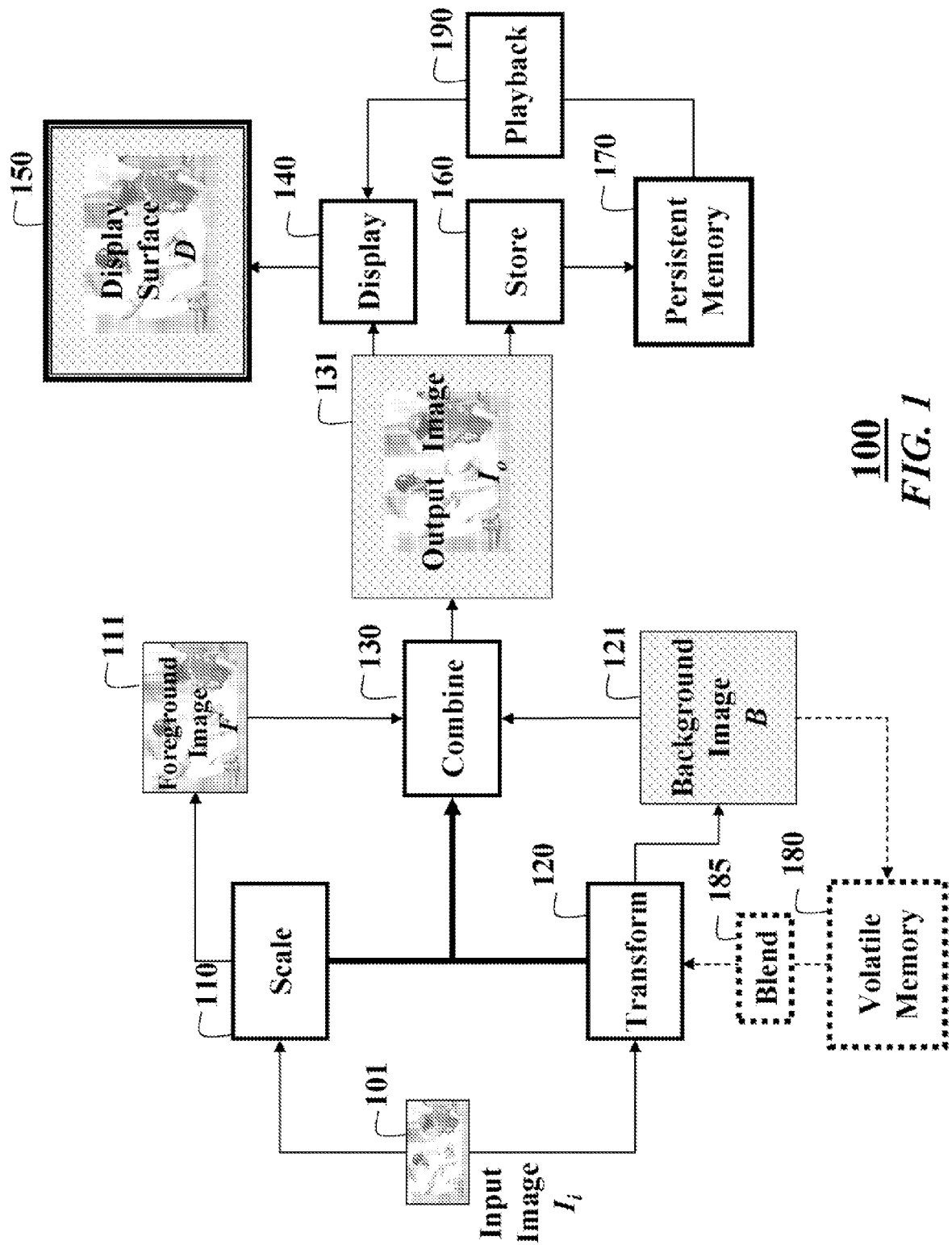
FIG. 1 is a block diagram of a method and system for displaying images according to the embodiments of the invention.

FIG. 1 shows a method 100 for displaying an image according to an embodiment of our invention. The method 100 can operate in a processor or microprocessor of a display device, such as a television, projector, playback device or client computer as known in the art. Such devices typically include one or more processing units and/or microcontroller, memories, and input/output interfaces connected by buses. The memories can include volitile memories, e.g., RAM 180 for temporal blending or 'smoothing' as described below. The processor can also have access to persistent memory 170, e.g., removable storage media such as video tapes and DVD, as well as communication interface, such as settop boxes, network interfaces and the like.

An input image $I_i$ 101 is scaled 110 to generate a foreground image F 111. The input image can be received via a communication channel or read from a computer readable storage medium. The scaling can increase or decrease the resolution of the input image to produce the foreground image.

The input image 101 has a resolution M×N pixels. The foreground image 111 has a resolution of p×q pixels. The scaling is such that a content of the foreground image corresponds directly to a content of the input image, and a resolution of the foreground image, when displayed, is smaller than a resolution of a display surface D 150. Image scaling is often called image retargeting, see e.g., U.S. patent application Ser. No. 11/682,521, "Method for Retargeting Images," filed by Avidan on Apr. 11, 2007, incorporated herein by reference.

The input image 101 is also transformed 120 to a background image B 121. The transformation is such that a content of the background image depends indirectly on the content of the input image. A resolution of the background image, when displayed on the display surface 150 D is larger than the foreground image F. A resolution of the background image B is r×s pixels, and a resolution of the display surface D is x×y pixels.

The foreground image F 111 is combined 130 with the background image B 121 to form an output image $I_o$ 131, a tangible and useful result. A resolution of the output image 131 is u×v. In the output image 131, the combining is such that pixels in the foreground image replace corresponding pixels of the background image. Then, the output image can be displayed 140 on a display surface D 150 for viewing by a user.

Thus, a relationship between the resolutions of the various images and the display surface is defined as;

$$F(p \times q) < B(r \times s) \leq O_o(u \times v) \leq D(x \times y).$$

Alternatively, the output image can be stored 160 in a persistent memory 170, e.g., a video tape or DVD for later playback 190 and display 140.

The scaling can be such that an aspect ratio and/or resolution of the input image 101 is different than an aspect ratio and/or resolution of the foreground image 111. The scaling can be 1:1. For example, if the input image has a resolution of 500×500, and the display surface has a resolution of 1000× 100, then a 1:1 scaling will ensure that the foreground image, when displayed, is smaller than the resolution of the display surface. Of course, the scaling can be up or down, as long as the size constraint between the foreground image and display surface is maintained.

When we say that the content of the foreground image corresponds directly to the content of the input image, we mean that the general appearance of the foreground image, when displayed, is substantially identical to the appearance of the input image, other than for the scaling factor.

A number of transformation methods are described below. When we say that the content of the background image depends indirectly on the content of the input image we mean that the appearance of the background image, when displayed can be different than the appearance of the input image. It should be noted that the transforming can include scaling, as well as changing the aspect ratios. We only require that the resolution constraint between the background image and the foreground image is maintained.

The combining is such that the pixels in the foreground image replace or overlay corresponding pixels in the background image. The actual arrangement of the background and foreground images with respect to the display screen is not important.

It should be noted that that the input, foreground, background and input images can have different resolutions, which can be larger or smaller than the other image, also the aspect ratios between the various images can be different.

It should also be noted that the above method, in a preferred embodiment, operates on a sequence of images, e.g., a video, or a broadcast or cablecast program.

Definitions and Terminology

The following definitions are used herein:

Average pixel values (intensities) include average characterizations, e.g., numerical averages, of pixel values of a corresponding region, e.g., the entire or part of the video image. An example of such characterizations is R, G, B integer values to represent the red, green, and blue values of the pixel in the image.

Downsampling produces an image that fits a desired resolution by removing pixels. During downsampling, the values of the removed pixels can be combined with the values of remaining pixels. Example of a simple downsampling is to just delete rows and columns with a spacing determined by the downsample ratio or resolution. With such a method, the number of rows that need to be removed, and the spacing needed between them, are computed. Another downsampling method is to divide the image into regions of pixels based on the downsampled resolution, and to determine downsampled image value based on average of all pixel values inside each region. More sophisticated low-pass filtering and subsampling techniques may also be used.

Interpolation includes linear, bilinear or other interpolation techniques between sets of values. Interpolation can include the method to produces an image that fits a desired resolution by adding pixels to the downsampled image.

An image includes a digital image, i.e., a representation of a two-dimensional image as a set of pixels. There can be a pixel for each (R, G, B) color channel.

Image scaling generally denotes a process of changing a resolution and/or aspect ratio of an image. Scaling can be a 1:1 scaling, i.e., the resolution remains the same.

Resolution refers to the number pixels in each row of an image, and the number of rows in the image, generally expressed as I(x×y).

A display surface is any device suitable for visual presentation of images, including text, acquired, stored, or transmitted in various forms. Examples of such devices are analog electronic displays, digital electronic display, projector displays, solid state displays and the like.

Video denotes a sequence of images.

Producing the Background Image

Figure 2:
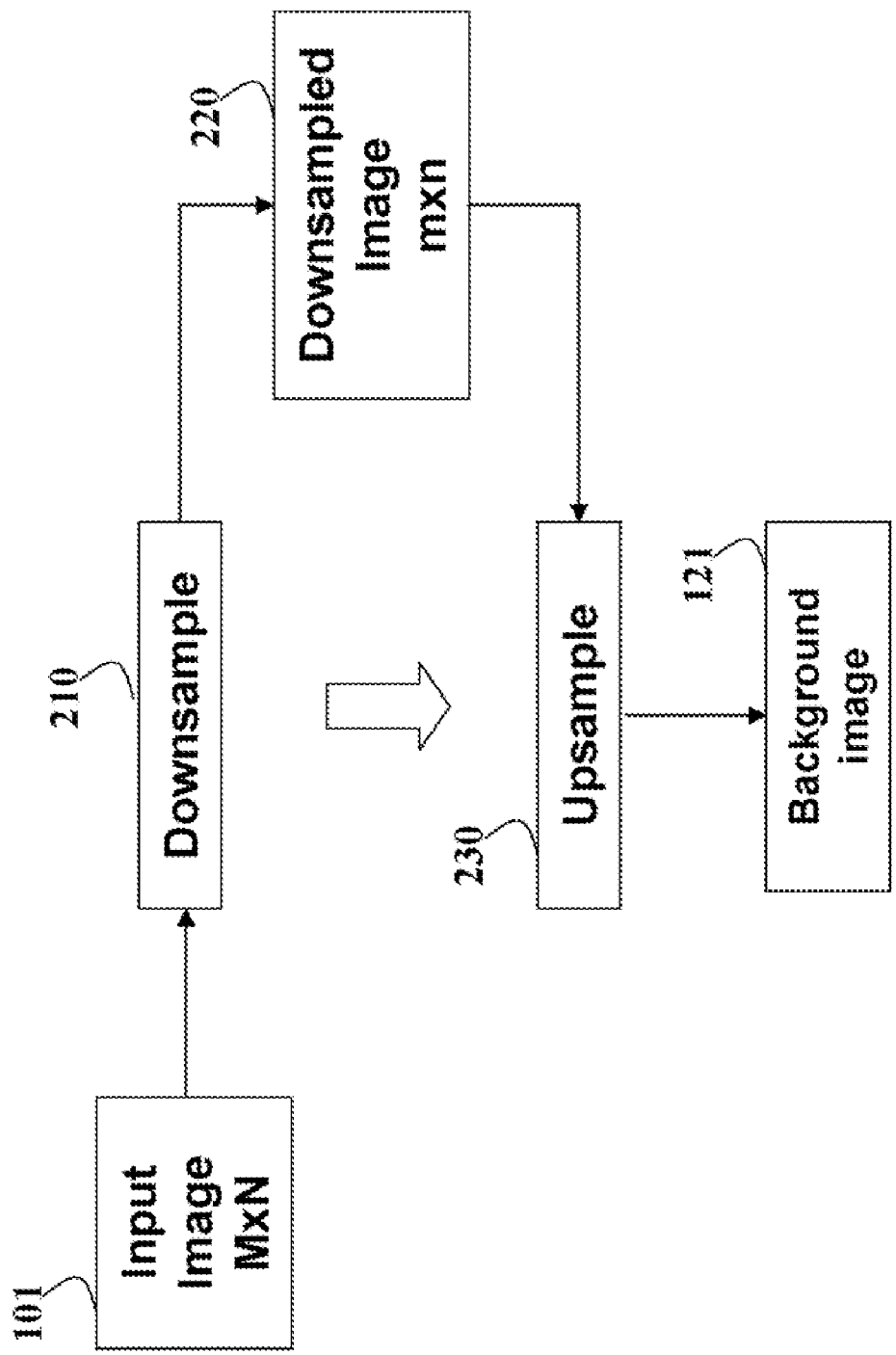
FIG. 2 is a block diagram of a method for forming a background image according to the embodiment of the invention.

FIG. 2 shows a method 200 for producing the background image B according to the embodiments of our invention. The M×N input image $I_t$ 101 is downsampled 210 to a m×n downsampled image 220, such that M×N>m×n. In our embodiments, we downsample the input image to less than 5×5, e.g., a 3×1, 3×2, 2×2, or 1×1 pixel image 220. Next, we upsample 230 the downsampled image 220 to match the desired resolution of the background image B(r×s) 121.

The net effect of the downsampling and the upsampling is that the background image is a "mix" of the dominant colors of the input image. Usually, the colors of the background in the scene provide the major contribution to the colors in the backgrounds image B.

For example, if the input image is of a grassy playing field, the background image will be mostly green. If the input image is of an indoor playing court, the background image is mostly brown, in case of a basketball court, or mostly white in case of a skating rink. For dramatic movies, a similar effect is realized. For example, an action scene with fire will cause the back ground to be mostly reddish, and a tropical seascape scene will provide an aqua background.

It is well known that color can be used to set the "mood" for a scene. This is known as "color mood" photography, see Eastman Kodak Company, "*Color As Seen and Photographed*" (B-74), Kodak Publication, Rochester, Second Edition, 1972.

The visual effect of the invention enhances this experience in that the background image provides a striking ambient lighting in the viewing area that substantially matches the dominant colors in the input images as they evolve over time. Thus, the invention accentuates the "mood" in the viewing area as set by the input images, without the use of ancillary lighting devices as in the prior art.

Figure 3:
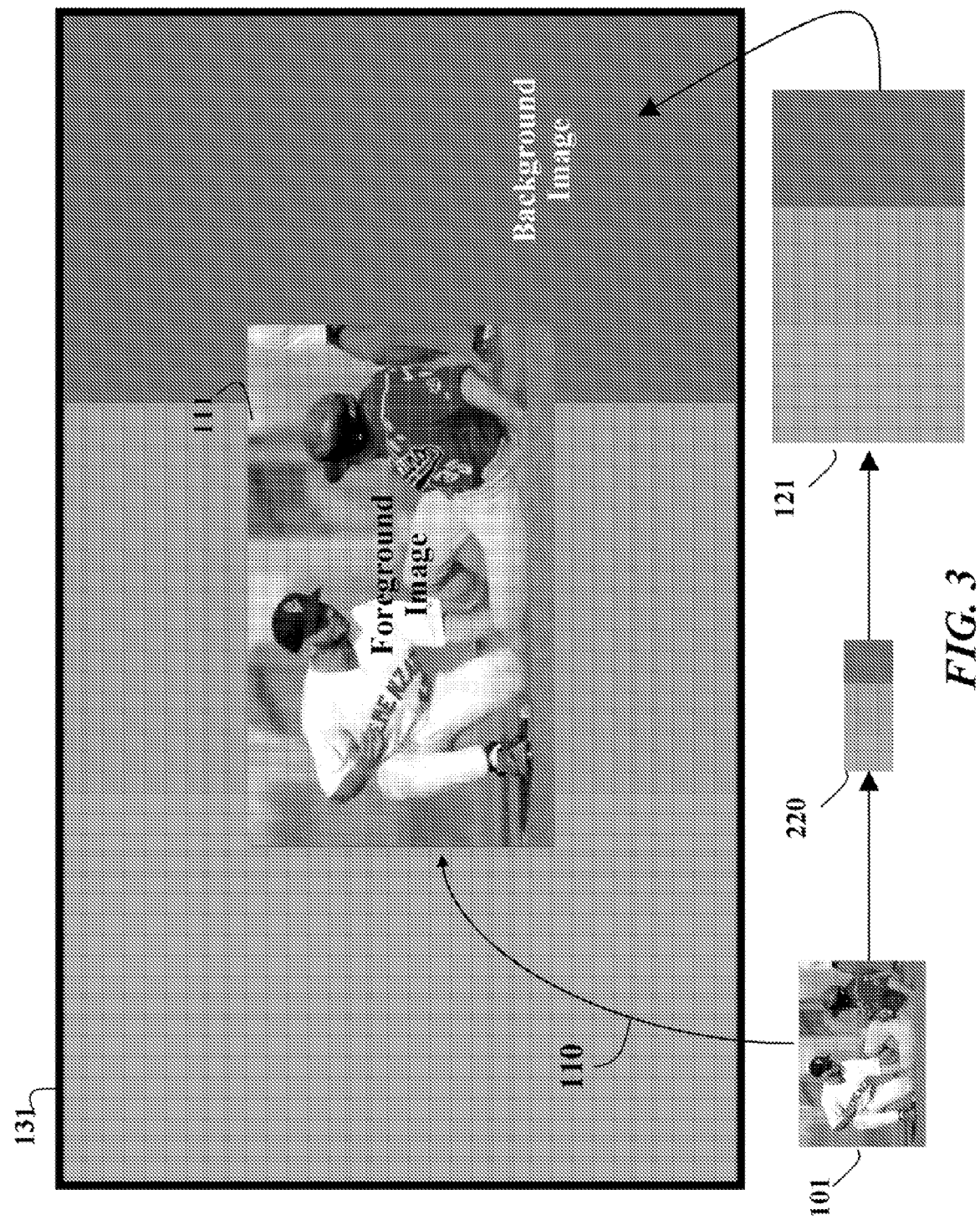
FIG. 3 is a visual example of a method for forming the background image according to the embodiment of the invention.

FIG. 3 shows our method 200 in the form of images.

If should be noted that the placement of the foreground image within the background image can be arbitrary, and depend in part on the underlying content of the images.

Producing the Darkened Background Image

Figure 4:
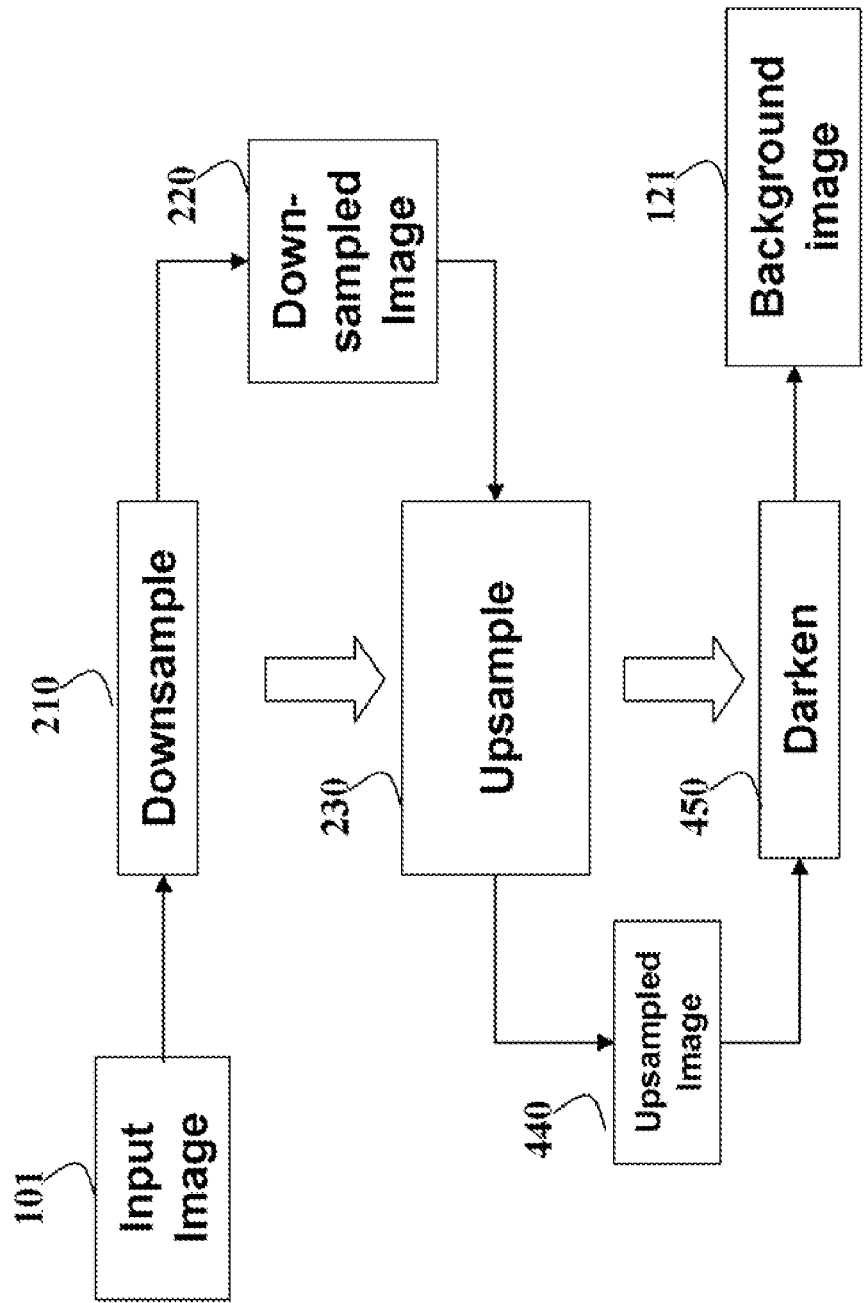
FIG. 4 is a block diagram of a method for forming the darkened background image according to the embodiment of the invention.

FIG. 4 shows a method 400 for producing a darkened background image according to the embodiments of our invention. A darker or desaturated background image gives the desired effect without visually competing with foreground image.

The input image 101 is downsampled 210 as before. The downsampled image 220 is upsampled 230 to an upsampled image 440. Finally, we darken 450 the upsampled image 440 to form the background image 121. In one embodiment, we darken the background image to have, e.g., 75%, of brightness of the foreground image.

Figure 5:
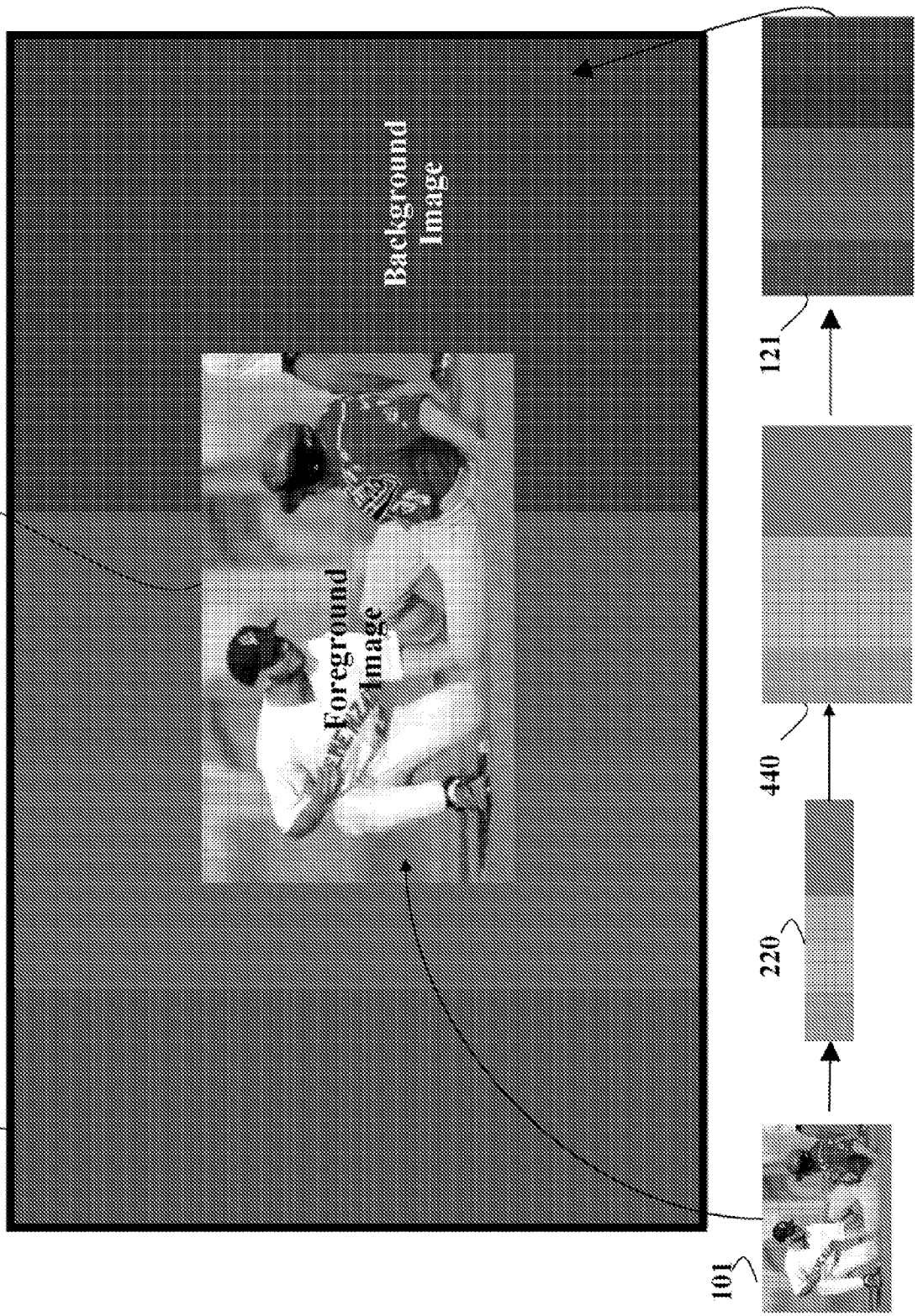
FIG. 5 is a visual example of a method for forming the darkened background image according to the embodiment of the invention.

FIG. 5 shows our method 400 in images.

Producing the Zoomed Background Image

Figure 6:
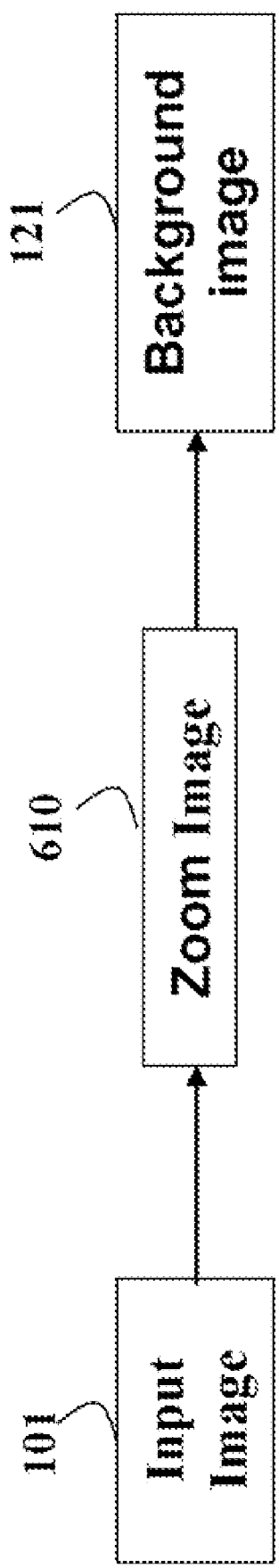
FIG. 6 is a block diagram of a method for forming the zoomed background image according to the embodiment of the invention.

FIG. 6 shows a method 600 for producing a zoomed background image according to the embodiments of out invention. The input image 101 is zoomed 610 to match the resolution of the desired background image 121.

Figure 7:
FIG. 7 is a visual example of a method for forming the zoomed background image according to the embodiment of the invention.

FIG. 7 shows our method 600 as images.

Producing Blended Background Images

In case of processing images sequentially, e.g., as for a video, our method, which combines the foreground and background images on a one-to-one basis, can cause the background image to have short-term frame-to-frame "flicker." This can distract the viewer.

Therefore, one embodiment of our invention temporally blends a current background image with one or more previous background images. The blending can be a function of a difference between the colors of the current image and the colors of a set (one or more) of previous background images stored in the memory 180. This temporal blending has the effect of "smoothing" the appearance of the background image over time. The number of previous background images controls the 'span' of the smoothing.

The temporal blending is performed as follows. The input image is processed as described above to produce a current background image. Then, we blend 185 the current image with the set of previous background images retrieved from the volatile memory 180. The set can include one or more background images. As stated above, it is assumed that usually the background in a scene provides the dominant color.

The blending can be a function of the difference between the colors of the current image and the previous stored images. In general, the weight, or blending factor, given to previous images is inversely proportional to the difference. In addition, a rate of change of the difference can be considered. Higher order derivatives of pixel values can also be used. The difference can be thresholded. Thus, within a scene, we assumed that the background colors evolve slowly over time, and are only affected by changes in colors of in the foreground in the scene. Thus, the colors in the background images will appear and evolve similarly.

However, during a scene or 'shot' change, the colors in the background will typically change drastically. Since the blending factor is inversely proportional to the difference, large differences might result in no blending. To impose the condition that some minimal blending occurs at every frame, the difference could be thresholded to a predetermined maximum value, e.g., 80% of the maximum possible difference. Without the thresholding, blending is disabled. Thus, as a scene changes, for example, from a subdued indoor color to strident outdoor color, this change is reflected in the dominant colors of the background images, and the scene change causes a comparable 'mood' change in the viewing area.

Sequence of Images

Figure 8:
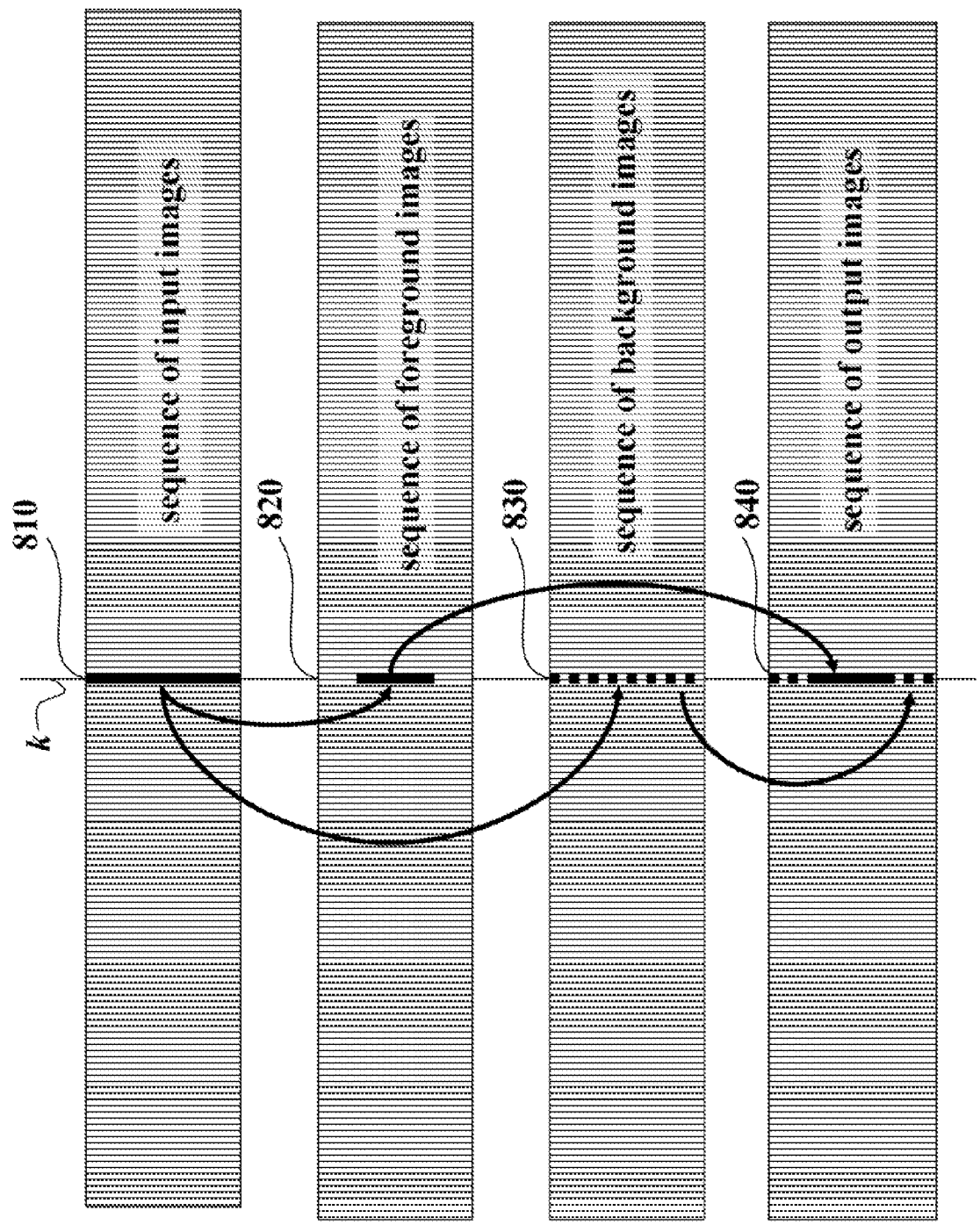
FIG. 8 is a block, diagram of organizational relationship between data sequences of corresponding images.

Although, the invention can operate on single images, the embodiments usually operate on a sequence of input images, e.g., a video, or a broadcast or cablecast program, i.e., the input image is a frame (image) of the video. In such a case, the result of the method according to the embodiments of the invention is a sequence of output images, in which every output image is produced from a time-wise corresponding input image. FIG. 8 shows the structure and organizational relationship of the image data. For every input image k 810, there is a corresponding foreground image 820, a corresponding background image 830, and a corresponding output image 840.

The sequence of output images can be displayed on the display surface in real-time as the input images are processed. Alternatively, the sequence of images can be stored in the persisted memory 170, e.g., removable storage media such as video tapes and DVD, as well as provided to a communication interface, such as settop boxes, network interfaces and the like, for later playback.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for converting an image for displaying on a display surface, comprising the steps of:
   storing in a memory at least a portion of a video formed by a plurality of frames, wherein a frame of the video is an input image;
   scaling the input image to generate a foreground image, in which a content of the foreground image corresponds directly to a content of the input image, and in which a resolution of the foreground image when displayed is smaller than a resolution of a display surface;
   transforming the input image to a background image, in which a content of the background image depends indirectly on the input image, and in which a resolution of the background image is larger than the resolution of the foreground image, wherein the transforming comprises:
      downsampling the input image to generate a downsampled image having a resolution less than 5×5 pixels; and
      upsampling the downsampled image to generate the background image;
   combining the foreground image with the background image to form an output image, in which pixels of the foreground image replace corresponding pixels of the background image; and
   repeating the scaling, the transforming, and the combining for all frames in the plurality of frames stored in the memory producing a plurality of output images, in which every output image is produced from a time-wise corresponding input image such that the plurality of output images forms an output video, wherein the scaling, the transforming, and the combining are performed by a processor.

2. The method of the claim 1, further comprising:
   displaying the output image on the display surface.

3. The method of the claim 1, further comprising:
   storing the output image in a persistent memory.

4. The method of the claim 1, wherein the scaling includes image retargeting.

5. The method of the claim 1, wherein the resolution of the foreground image is identical to a resolution of the input image.

6. The method of the claim 1, wherein the resolution of the foreground image is different than a resolution of the input image.

7. The method of claim 1, wherein the transforming further comprises:
   darkening the upsampled image.

8. The method of claim 1, wherein the transforming further comprises:
   darkening the downsampled image.

9. The method of claim 1, wherein the transforming further comprises:
   blending the background image with a set of previous background images stored in the memory, wherein the blending is a temporal blending.

10. The method of claim 9, wherein the blending is inversely proportional to a difference between the background image and the set of previous background images.

11. The method of claim 10, wherein the difference is thresholded to a maximum range.

12. An apparatus for converting an image for displaying on a display surface, comprising:
   means for scaling an input image to generate a foreground image, in which a content of the foreground image corresponds directly to a content of the input image, and in which a resolution of the foreground image when displayed is smaller than a resolution of a display surface;
   means for transforming the input image to a background image, wherein the transforming includes downsampling the input image to generate a downsampled image having a resolution less than 5×5 pixels; and upsampling the downsampled image to generate the background image, in which a content of the background image depends indirectly on the input image, and in which a resolution of the background image is larger than the resolution of the foreground image; and
   means for combining the foreground image with the background image to form an output image, in which pixels of the foreground image replace corresponding pixels of the background image.

13. The apparatus of claim 12, wherein the transforming downsamples the input image to generate a downsampled image, and upsamples the downsampled image to generate an upsampled image corresponding to the background image.

14. The apparatus of claim 13, wherein the transforming darkens the upsampled image.

15. The apparatus of claim 12, wherein the transforming zooms the input image to obtain the background image.

16. The apparatus of claim 12, wherein the transforming blends a current background image with a set of previous background images.

17. A memory for storing data for access and processing by a video playback system, comprising:
   a data structure stored in a memory, in which the data structure including a sequence of output images forming a video, wherein each output image is organized to include a foreground image stored in the memory, wherein the foreground image corresponds directly to a content of an input image and in which a resolution of the foreground image when played back is smaller than a resolution of a display surface of the playback system, and a background image stored in the memory wherein the background image corresponds indirectly to the input image and includes only dominant colors of the input image and in which a resolution of the background image is larger than the resolution of the foreground image and in which the foreground image and the background image are organized in the memory so that pixels of the foreground image replace corresponding pixels of the background image to form the output image.

* * * * *